United States Patent [19]

Zucker, deceased et al.

[11] Patent Number: 4,972,153

[45] Date of Patent: Nov. 20, 1990

[54] APPARATUS FOR DETECTING A PLURALITY OF ENERGY LEVELS IN A CONDUCTOR

[76] Inventors: Myron Zucker, deceased, late of Royal Oak; by Robert Benson, Legal Representative, Tower 200 Renaissonce Center Ste. 1600, Detroit, both of Mich. 48243; Michael Z. Lowenstein, 17100 Addison, Southfield, Mich. 48075; Ronald G. Jawernycky, 22031 Malden, Farmington Hills, Mich. 48024

[21] Appl. No.: 322,201

[22] Filed: Mar. 13, 1989

Related U.S. Application Data

[63] Continuation-in-part of Ser. No. 110,115, Oct. 19, 1987, Pat. No. 4,849,849, and a continuation-in-part of Ser. No. 196,369, May 19, 1988.

[51] Int. Cl.$^5$ ............................................. G01R 31/02
[52] U.S. Cl. .................... 324/537; 324/522; 324/127; 361/87; 361/93
[58] Field of Search ............. 324/537, 522, 509, 510, 324/525, 555, 548, 549, 122, 96, 127, 523; 361/94, 97, 87, 93

[56] References Cited

U.S. PATENT DOCUMENTS

| | | | |
|---|---|---|---|
| 3,875,464 | 4/1975 | Gary et al. | 361/31 |
| 4,419,621 | 12/1983 | Becker et al. | 324/548 |
| 4,425,541 | 1/1984 | Burkum et al. | 324/548 |
| 4,429,340 | 1/1984 | Howell | 361/94 X |
| 4,434,401 | 2/1984 | York | 324/537 X |
| 4,438,396 | 3/1984 | Harnden, Jr. et al. | 324/127 |
| 4,510,549 | 4/1985 | Tedesco | 361/86 |
| 4,536,704 | 8/1985 | Burkum et al. | 324/548 X |
| 4,539,618 | 9/1985 | Stich | 361/94 |
| 4,540,935 | 9/1985 | Burkum et al. | 324/548 |
| 4,541,029 | 9/1985 | Ohyama | 361/31 |
| 4,605,982 | 8/1986 | Harner et al. | 361/94 |
| 4,751,605 | 6/1988 | Mertz et al. | 361/93 X |

Primary Examiner—Gerard R. Strecker
Assistant Examiner—Robert W. Mueller
Attorney, Agent, or Firm—Irving M. Weiner; Joseph P. Carrier; Robert M. Petrik

[57] ABSTRACT

Energy sensing and monitoring apparatus is disclosed which can sense a plurality of energy levels in a conductor, and provide an indication when any of such energy levels is improper. The energy sensing apparatus includes an inductive device for sensing an energy level in a conductor and for providing an input signal indicative of the energy level; a comparator for receiving the input signal, comparing the input signal to a plurality of predetermined level ranges, and providing an output signal when the input signal does not fall within at least one of the predetermined level ranges; and a power source for supplying power to the comparator.

15 Claims, 4 Drawing Sheets

APPARATUS FOR DETECTING A PLURALITY OF ENERGY LEVELS IN A CONDUCTOR

BACKGROUND OF THE INVENTION

This application is a continuation-in-part of U.S. patent application Ser. No. 110,115 filed Oct. 19, 1987, now U.S. Pat. No. 4,849,849, and is also a continuation-in-part of U.S. patent application Ser. No. 196,369, filed May 19, 1988.

Field of the Invention

The invention relates generally to apparatus for detecting malfunctions of even a single electrical device in a whole group of electrical devices, and methods of constructing and utilizing same. More particularly, the present invention relates to a monitoring instrument which is connectable to a group of electrical devices for detecting when one of more of the electrical devices in the group is malfunctioning, and for providing an indication of such malfunction.

Description of the Relevant Art

There are known instruments which can be used to detect malfunctions of a single electrical device in a group of electrical devices. For example, U.S. Pat. No. 4,419,621 discloses a "monitoring system for the capacitor batteries of a three-phase filter circuit." The disclosed, patented system is specifically designed to monitor the magnitude and phase of the fundamental frequency components of current flowing from a Y-circuit node by which the individual capacitor batteries are coupled to one another, and to evaluate any variations of the fundamental frequency components to specifically identify defective sectional capacitors.

The patented system has disadvantages associated therewith. For example, the disclosed system is based on a fairly complex electrical circuit whereby it has a relatively high cost. Further, the patented system does not include its own power supply (or is based on internal current signaling), whereby it cannot be used on many electrical devices, such as metalized-type devices, which do not short out when they malfunction. Also, it would be difficult and impractical to use the disclosed instrument for monitoring a large number of electrical devices because of its complexity.

There are also known instruments, such as disclosed in copending application U.S. Ser. No. 110,115, which can be used to monitor/indicate when a single electrical device has malfunctioned. However, such an instrument is required to be associated with (or monitor) only a single electrical device, so that if a large number of electrical devices were grouped together, such as in a switched bank, then each of the electrical devices would have its own monitoring instrument. Obviously, the use of many monitoring instruments in relation to a large group of electrical devices can be undesirably cumbersome and expensive.

Further, there are known instruments for identifying specific, defective electrical devices which are grouped together with similar electrical devices during normal use. For example, U.S. Pat. Nos. 4,425,541, 4,536,704 and 4,540,935 disclose several related instruments for identifying defective electric power distribution capacitors. Each of the instruments disclosed in these patents includes a power supply for supplying an alternating current to a de-energized capacitor while the capacitor is still installed in a bank of capacitors and a measurement device for measuring the magnitude of electric current entering the capacitor to thereby determine if it is functioning properly. The disclosed instruments are used by utility company linemen, for example, to accurately determine which specific capacitors (if any) in a bank of capacitors are defective. In use, the linemen must initially disconnect a three-phase capacitor bank from a high voltage line by opening line switches and capacitor fuse protectors, waiting for a period of time for the capacitor bank to discharge through internal resistors, and then take a reading of each individual capacitor to determine if it is defective. Such known instruments are quite useful and could, in fact, be used in addition to the present invention. Particularly, the present invention only functions to indicate that there is a malfunction of one or more electrical devices in a group. Once such an indication is made an operator would have to specifically identify/replace which one(s) of the electrical devices are defective, and could do so using the discussed, known instruments. It will be understood, however, that use of the discussed, known instruments is relatively time consuming or labor intensive, whereby use of such known instruments to simply, initially determine if there is a malfunction of any electrical device in a group of the electrical devices can be unnecessarily and undesirably expensive.

Additionally, there are known instruments which monitor both an overload condition and a light-load condition of a single electrical device, such as an induction motor. For example, such an instrument is disclosed in U.S. Pat. No. 4,541,029. As indicated, the disclosed instrument is not intended or constructed for use in monitoring when a single electrical device in a group of electrical devices malfunctions. Moreover, the disclosed instrument is based on a relatively complex circuit and could not be easily or practically adapted for use in monitoring when a single electrical device in a group of electrical devices malfunctions.

Conventional monitoring and testing instruments, including those discussed above, have many problems and disadvantages associated therewith, and have as a whole failed to fulfil a need in the art for a simple monitoring/indicating instrument which can be easily used in association with large groups of electrical devices to provide a simple, initial indication when one or more of the electrical devices in the group has malfunctioned.

SUMMARY OF THE INVENTION

The present invention has been developed to overcome the above discussed limitations and disadvantages of known monitoring and testing instruments, and to thereby satisfy a great need in the art.

According to the present invention there is provided an energy sensing apparatus for sensing a plurality of energy levels in a conductor. The apparatus comprises an inductive means for sensing an energy level in a conductor and for providing an input signal indicative of the energy level; comparator means for receiving the input signal, comparing the input signal to at least one predetermined reference level range, and providing an output signal when the input signal falls within the reference level range; and a power source means for supplying power to the comparator means.

It is an object of the present invention to provide a monitoring device which can detect a plurality of energy levels in a conductor, which can compare the actual energy level in the conductor to at least one predetermined (reference) level range, and which provides an indication when the actual energy level in the conductor falls within the predetermined level range.

Another object of the present invention is to provide such a monitoring device which is capable of automatically comparing the actual energy level in the conductor to a plurality of predetermined level ranges in a stepped manner, and which provides an indication when the actual energy level falls within any of the predetermined level ranges.

Still another object of the present invention is to provide such a monitoring device which can consistently and accurately determine that a zero energy level in the conductor is one of the plurality of predetermined (appropriate) level ranges.

Other objects, advantages and salient features of the present invention will become apparent from the following detailed description, which, when taken in conjunction with the annexed drawings discloses preferred embodiments of the present invention.

BRIEF DESCRIPTION OF THE DRAWINGS

FIG. 4 is a circuit diagram of a power supply which can be used with either of the disclosed embodiments of the present invention.

FIGS. 5a and 5b are two different resistor networks which can be used in cooperation with the first embodiment of the present invention, as shown in FIG. 2.

DETAILED DESCRIPTION OF PREFERRED EMBODIMENTS

Figure 2:
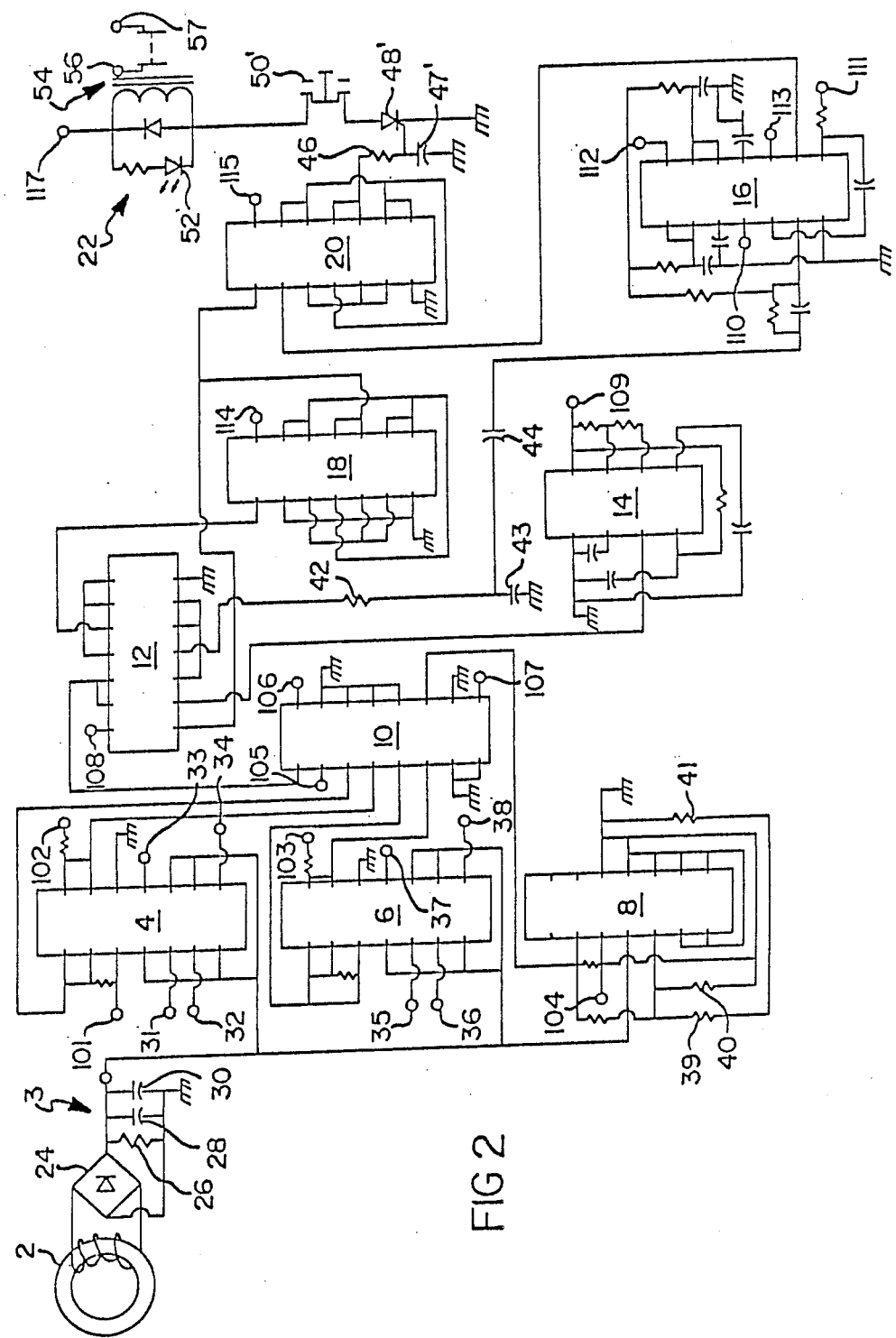
FIG. 2 is a circuit diagram of a first embodiment of a detecting apparatus according to the present invention.

Referring to FIG. 2, there is shown a circuit diagram for the main circuit 1 of an instrument according to a first embodiment of the present invention. The circuit 1 primarily includes a current transformer 2, an input signal conditioner 3, a plurality of window gates 4, 6, 8, a combining logic member 10, a timer logic member 12, a timer trigger 14, a timer 16, detector logic members 18, 20, and an indicator means 22.

The current transformer 2 is a preferred inductive means which is operatively connected to a group of electrical devices and provides an input signal to the rest of the circuit 1 indicative of electrical energy in the electrical devices. The current transformer 2 can, for example, be connected to the group of electrical devices by using a common input line of the electrical devices as the primary winding for the current transformer 2.

As depicted, the input signal conditioner 3 may include a bridge rectifier 24, a resistor 26 and a pair of capacitors 28, 30. However, any other appropriate input signal conditioning means could be used.

Collectively, the window gates 4, 6, 8 and the combining logic member 10 function as a comparator means. Each of the window gates 4, 6, 8 receives a conditioned input signal from the signal conditioner 3 and compares it to one or more predetermined, appropriate ranges of reference values. Particularly, each of window gates 4, 6 would compare the conditioned input signal to two appropriate ranges of reference values, while window gate 8 would compare the conditioned input signal to a single range of reference values.

As depicted, the ranges of values used by window gates 4, 6 are preferably set using a resistor network, such as network 80 shown in FIG. 5a or network 90 shown in FIG. 5b, having terminals thereof connected to terminals 31-38 of window gates 4, 6. Similarly, the range of values used by window gate 8 is preferably set using the resistors 39-41. However, it will be understood that the range of reference values for window gate 8 could also be set using resistor network 80 or 90, while any other appropriate range/reference setting means could be used in place of the resistor network 80 or 90 and the resistors 39-41.

In operation, if the conditioned input signal falls within one of the reference value ranges of window gates 4, 6, 8, the corresponding gate will send an output signal to the combining logic member 10. So long as the combining logic member 10, which functions as a multiple OR gate, receives an output from any window gate, it will not send a default signal to the time logic member 12. In other words, as long as the conditioned input signal falls within one of the reference value ranges, the combining logic member 10 will output a default signal to the timer logic member 12.

Each of the reference value ranges of the window gates 4, 6, 8 can be predetermined to correspond to an electrical energy level that would be normally encountered when a variety of electrical devices or combination of such devices are turned on. For example, the reference value range of window gate 8 could be set to a very low value such as normally encountered when none of the electrical devices is turned on, whereby the window gate 8 would be a zero current gate, and the four reference value ranges of window gates 4, 6 could progressively correspond to electrical energy levels that would be normally encountered when 1, 2, 3 and 4 electrical devices are turned on, respectively.

Alternatively, the window gate 8 could be used as a zero current gate, while each of the four reference value ranges in the window gates 4, 6 could correspond to an electrical energy level that would be normally encountered when a different, whole group of electrical devices was turned on. In this manner, the circuit 1 shown in FIG. 2 is particularly advantageous for monitoring several groups of electrical devices, each group forming a step in a very large bank of the electrical devices which can be selectively and/or progressively turned on as required.

Although three window gates 4, 6, 8 are shown in FIG. 2, it is possible to have substantially any number of the gates. However, where larger numbers of the window gates are used it would be necessary to use a correspondingly increased number of the combining logic members 10.

Also, it is possible to have a separate inductive means associated with each electrical device individually or with each step/group of electrical devices in a large switched bank, and to have an input signal from each such inductive means sent to a separate window gate. However, such arrangement would be unnecessarily bulky and difficult to assemble because of all the separate components and connections.

Further, as a modification to circuit 1, it is contemplated that only one window gate could be used in combination with a means for automatically setting or adjusting the reference value range of the window gate in dependence on which of the electrical devices in a group are turned on. Such automatic setting means could, for example, comprise a pair of variable resistors (one for the upper range limit and the other for the lower range limit), and contactors each individually associated with one of the electrical devices and which would change the upper and lower limits of the variable resistors when the electrical devices are turned on or off.

An appropriate window gate for use in the present invention is a LM339 chip while an appropriate combining logic member is a 4048 chip.

As discussed above, when the combining logic member 10 outputs a default signal, it is sent to the timing means. The timing means collectively comprises the timing logic member 12, the timer trigger 14 and the timer 16. In operation, the timer trigger 14, which is effectively an oscillator, provides a continuous output to the timer logic member 12. The timer logic member 12, in turn, functions as an AND gate such that when it receives a default signal from the combining logic member 10 simultaneously with the output signal from the timer trigger 14, it sends a start signal to the timer 16 which, in turn, sends a timer signal to the second detector logic member 20 after a predetermined appropriate time period.

The timer logic member 12 also forwards the default signal from the combining logic member 10 to the first detector logic member 18, which is a hex inverter buffer. Member 18 in turn sends the default signal to the second detector logic member 20. The second detector logic member 20 effectively functions as an AND gate such that when it simultaneously receives the default signal from the first detector logic member 18 and the timer signal from the timer 16 it sends an enable signal to the indicator means 22. The first and second detector logic members 18, 20 collectively comprise a detector means.

As will be understood, it is possible to greatly simplify the timer means and the detector means shown in FIG. 2, such as by providing the default signal directly from the combining logic member 10 to the timer 16 (so that the default signal functions as a start signal) and to the second detector logic member 20. However, the depicted structure is preferred because it is very reliable. For example, applicant has found that the timer 16 does not reliably start without the use of timer trigger 14.

A preferred timer logic member 12 according to the present invention is a Schmitt trigger, such as a 4093 chip. The Schmitt trigger is preferred because it provides high accuracy with respect to the start signal sent to the timer 16 and the default signal forwarded to the first detector logic member 18. A preferred timer trigger is a 555 chip, a preferred timer is a 556 chip, a preferred first detector logic member is a 4001 chip and the second detector logic member 20 is preferably a 4091 chip.

Resistor 42 and capacitors 43, 44 function to ensure the integrity of the start signal sent from the timer logic member 12 to the timer 16. Similarly, resistor 46 and capacitor 47 function as a filter to prevent any power surges, such as might occur when the instrument or any of the monitored electrical devices is turned on, from improperly enabling the indicator means 22.

Between the second detector logic member 20 and the indicator means 22 there are optionally provided a latching relay 48, such as a 2N5060 SCR, and a reset switch 50. The latching relay 48 ensures that if one of the electrical devices malfunctions for the predetermined time period set by the timer 16, then the indicating means 22 cannot be de-actuated even if the malfunctioning electrical devices should (temporarily) stop malfunctioning. In other words, the latching relay 48 ensures that the present invention will provide an indication that there is or was a malfunction in one of the monitored electrical devices.

The reset switch 50 permits an operator who has observed the indicating means in an enabled state to easily reset the circuit 1 and thereby quickly determine if any of the monitored electrical devices is actually (still) malfunctioning by simply observing whether or not the indicating means 22 is re-enabled after the predetermined time period. If the reset switch 50 is not used, it would be necessary for the operator to turn the power supply to circuit 1 off, wait a few seconds, and then turn it back on to reset the circuit, which can be difficult at times if one is running a production line.

The indicator means 22 can include any desired type of indicator or indicators. The depicted indicator means includes LED 52 as an indicator light and a high sensitivity relay 54 which would have the output terminals 56, 57 thereof connected to an audible alarm, a computer control system, etc.

Referring to FIG. 4, there is shown a circuit 70 of an appropriate power supply, such as a low voltage DC power supply, for the main circuit 1 of FIG. 2. The power supply circuit 70 includes input terminals 71, 72 which would be connected to an appropriate power source, such as 480 volts AC, or by selection of appropriate connections on the transformer for any desired voltage, a transformer 73, a bridge rectifier 74, and an appropriate voltage regulator 75, such as a 7815. Output terminals 76, 77 of the power supply circuit 70 are then connected to each of members 4–22 at input terminals 101–117.

Figure 1:
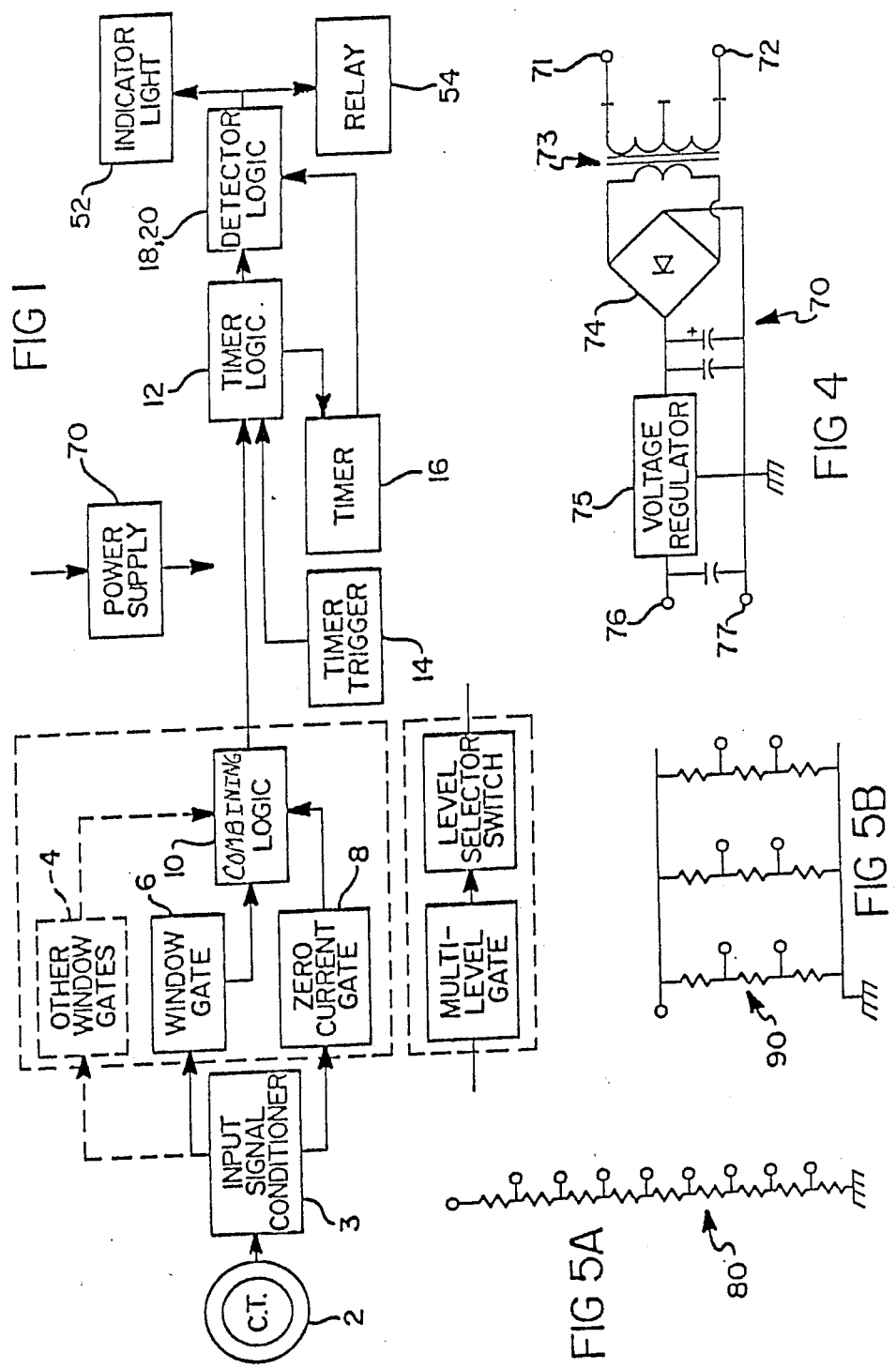
FIG. 1 is a block diagram of the two disclosed embodiments of the invention shown in FIGS. 2 and 3.

A block diagram of circuit 1 is shown in FIG. 1.

Figure 3:
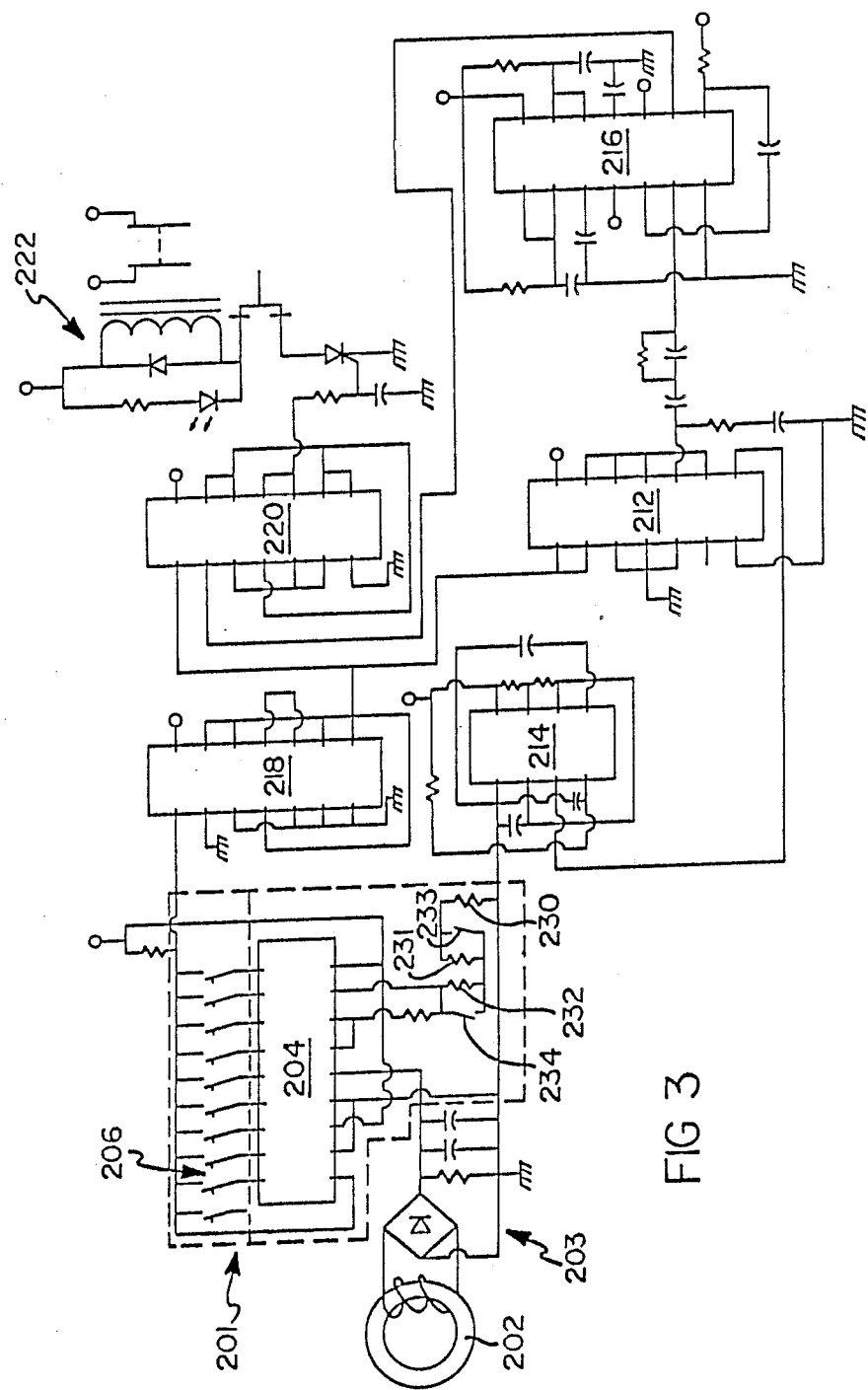
FIG. 3 is a circuit diagram of a second embodiment of a detecting apparatus according to the present invention.

Referring to FIG. 3, there is shown a circuit diagram 201 of a second embodiment of the present invention. As is apparent, the inductive means 202, the input signal conditioner 203, and the indicator means 222 of circuit 201 are identical to the corresponding components of circuit 1. Accordingly, these components will not be discussed again.

Further, the timer means and the detector means of circuit 201 are substantially similar in both structure and function to the corresponding components of circuit 1 except that the first detector logic member 218 is directly connected to the comparator means for receiving a default signal therefrom and passes the default signal to the timer logic member 212, whereas in circuit 1 the timer logic member 12 is directly connected to the comparator means for receiving the default signal therefrom and passes it on to the first detector logic member 18. In both circuits, however, the overall functioning of the timer means and the detector means is substantially the same. For example, the timer logic member 212 in circuit 201 functions as an AND gate and sends a start signal to timer 216, just as timer logic member 12 in circuit 1 functions as an AND gate and sends a start signal to timer 16. Accordingly these portions of circuit 201 will also not be discussed again. A preferred timer logic member 212 for circuit 3 is a 4023 chip.

Thus, the only substantial difference between circuit 1 and circuit 201 is with respect to the comparator means thereof. Particularly, in circuit 201 the comparator means comprises a multi-level gate 204, a level selector switch 206 and a reference value means including resistors 230-232 and switches 233, 234.

The multi-level gate 204 has a plurality of upper outputs (output pins), ten in the depicted embodiment. Each of the upper outputs has a different energy level associated therewith, and these different energy levels will preferably increase in a stepped manner from left to right in FIG. 3.

The multi-level gate 204 cooperates with the reference value setting means and the level selector switch 206 to permit an operator to rapidly adapt the circuit 201 to monitor different energy levels in the conductor. Particularly, the switches 233, 234 of the reference value setting means can be selectively opened or closed to vary the overall resistance encountered in resistors 230, 232 to one of four different values. Each one of the four different resistance values can then be associated with each of the upper output pins of the multi-level gate 204 to provide a total of forty different reference energy levels which can be compared by the gate 204 to the level of an input signal by selectively opening and closing the switches 233, 234 of the reference value setting means. In turn, a specific one of the upper output pins of the gate 204 will be selectively connected to the rest of the circuit 201 by closing a corresponding one of the switches of the level selector switch 206. In operation, the multi-level gate 204 will pass an output signal (indicative of proper operation of the monitored devices) through a chosen one of the switches of level selector switch 206 as long as the energy level of the input signal exceeds the reference energy level associated with the corresponding upper output of the gate 204 and with the resistance value of the reference value setting means. See, for example, Table I below which shows forty different reference energy levels that can be selectively monitored by the circuit of FIG. 3 by appropriately adjusting level selector switch 206 and the switches 233, 234 of the reference value setting means. The values (in K ohms) of resistors 230, 232 in the example of Table I are 2.7, 2.0 and 2.1, respectively.

Figure 6:
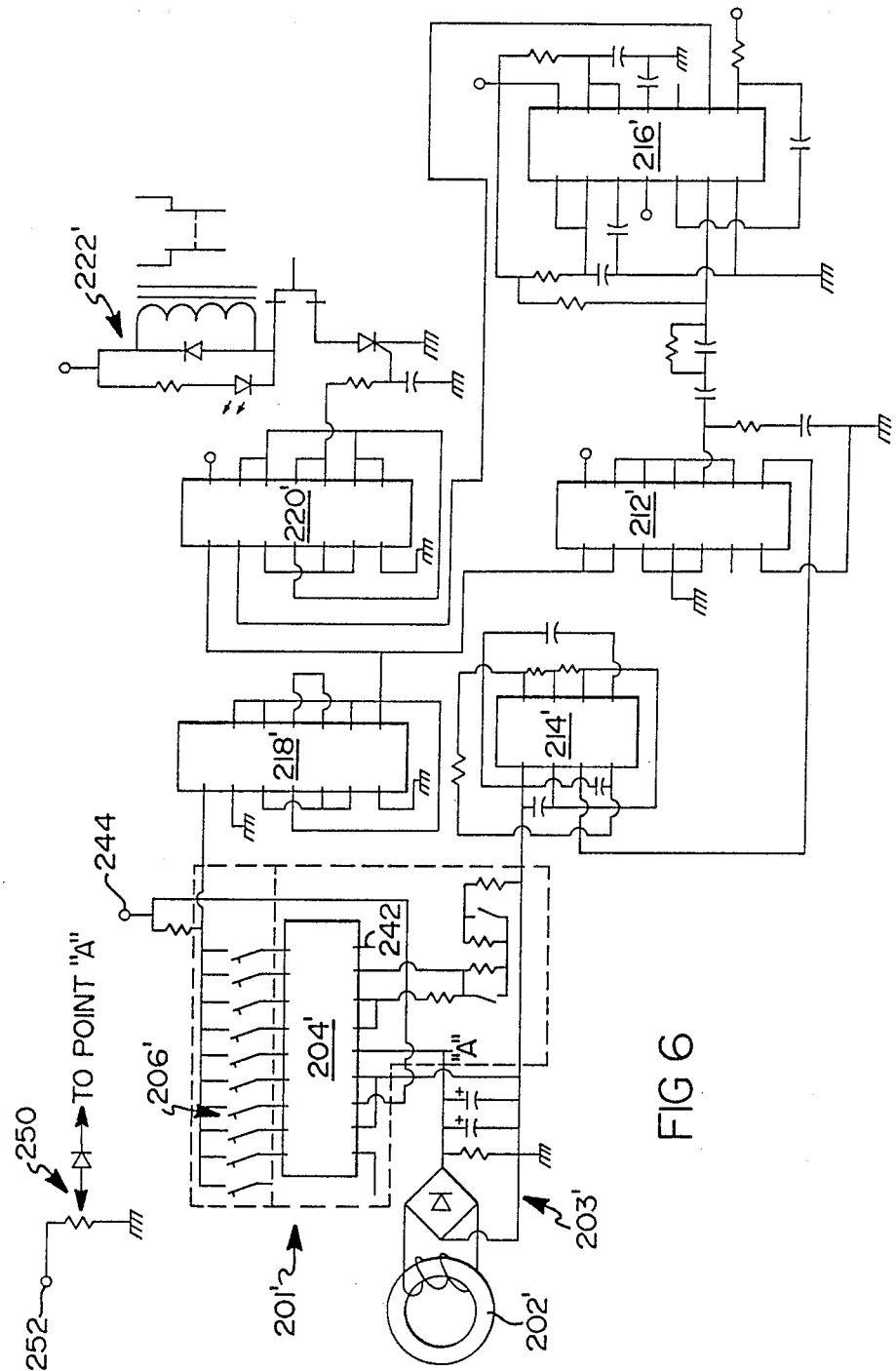
FIG. 6 is a modification of the second embodiment of the invention in which the multi-level gate is modified to function as a switch selected multiple window discriminator.

Referring to FIG. 6, there is shown a modification of the second embodiment of the present invention. For consistency and ease of understanding, parts in the circuit of FIG. 6 are identified by primed reference numerals corresponding to the reference numerals of like parts in the circuit of FIG. 3.

The modification of the circuit in FIG. 6 relates to the connections and the method of operation of the multi-level gate 204'. Particularly, in the modified circuit the lower, right side, end pin 242 of the multi-level gate 204' is disconnected from the power source 70, which is connected to the circuit 201' at terminal 244. With the pin 242 disconnected from the power source, the multi-level gate 204' is operated in the dot mode. In other words, the upper ten outputs (output pins) of the gate 204' correspond to different, stepped windows (or energy level ranges), and the gate 204' applies an output signal to one of the upper outputs when the input signal from the signal conditioner 203' falls within the window corresponding to that output. On the other hand, when the input signal is at a level below the window associated with a given upper output, the gate 204' applies the output signal to the previous upper output; and when the level of the input signal is greater than the window associated with a given output, the gate 204' applies the output signal to the next upper output. Thus, the gate 204' functions as a switch selected multiple window discriminator.

In contrast, the unmodified, multi-level gate 204 in the circuit of FIG. 3 merely provides the output signal to one of the upper outputs as long as the energy level of the input signal exceeds the specific energy level associated with that upper output.

The modified gate 204' is very advantageous and desirable because it can be used to automatically compare an input signal to a plurality of windows (or level ranges) and provide an output signal to the rest of the circuit 201' (through the level selector switch 206') as long as the input signal falls within any one of the plurality of windows.

To effect such an automatic, multiple window comparison an operator would merely close a plurality of the switches of the level selector switch 206', while leaving at least one open switch between any two closed switches. Each of the closed switches would then correspond to one of the windows that is compared to the input signal, and would pass an output signal from the gate 204' if the input signal falls within such window.

If a combination of the switches of the level selector switch 206' is selected with a consistent pattern (such as alternating open and closed switches, or two open switches between each pair of closed switches), then the windows associated with the closed switches would be set to pass an output signal when the input signal is in multiples of a base current established by the reference value setting means. For example, if the base current is 50 amps and the third, sixth and ninth switches (counting from the right in FIG. 6) are closed the windows associated with the selected switches would preferably be set to pass an output signal when the input signal is in the level ranges of 44-56 amps, 94-106 amps and 144-156 amps, respectively. Thus, in this example, the gate 204' and the level selector switch 206' would allow for three automatic switching steps of 50 amps each. This type of operation is particularly desirable in situations where the circuit 201' is being used to monitor a group of similar electrical devices and the devices can each be selectively turned on or off according to normal operating conditions during the period of monitoring. Thus, if only one of the electrical devices was operating, the input signal would fall within the window associated with the first closed switch if the device was operating properly, and if two, three, etc. electrical devices were operating the input signal would fall within the window associated with the second, third, etc. closed switch if all of the electrical devices were operating properly.

Note, two or more of the multi-level gates 204' and the level selector switches 206' can be connected in series to provide additional windows for comparison to the input signal.

Again, the modified circuit 201' should be distinguished from the circuit 201 of FIG. 3 because in the unmodified circuit 201 it is only possible to compare an input signal to a single reference energy level regardless of how many of the switches of the level selector switch 206 are closed. Particularly, if more than one of the switches in unmodified circuit 201 were closed, then the gate 204 would pass an output signal to the rest of the circuit (indicating proper operation of the monitored devices) as long as the energy level of the input signal was greater than the reference energy level associated with the lowest selected switch.

In the modified circuit 201' the switches of 233, 234 of the value setting means can be selectively manipulated by an operator to establish different reference level ranges for each of the output pins of the multi-level gate 204', in a manner similar to the unmodified circuit 201.

A further modification presented in FIG. 6 is the application of a zero bias signal to the input signal emanating from the input signal conditioner 203' before the input signal is received by the multi-level gate 204'. Referring to FIG. 6 an appropriate zero bias signal is generated, for example, by a potentiometer 250 and is applied to the connection between the input signal conditioner 203' and the multi-level gate 204' at "A". The potentiometer is connected to the power source 70 at terminal 252.

The introduction of the zero bias signal is particularly desirable in situations where the circuit 201' is being used to monitor a group of electrical devices, and all of the electrical devices may be simultaneously nonoperational (such that an input signal from the signal conditioner 203' has a zero energy level) according to normal operations during the monitoring period. Thus, if the input signal output by the signal conditioner 203' is at a zero energy level the modified input signal being received by the multi-level gate 204' would have an energy level corresponding to the zero bias signal. Further, a first closed switch of the level selector switch 206' (for example, the first switch from the right hand end in FIG. 6) would have a window associated therewith that included the energy level simulated by the zero bias signal. For example, if the zero bias simulates a current of 20 amps, the window associated with the first switch could have a range of 18-22 amps. In operation the circuit 201' an operator would close a desired combination of the switches of the level selector switch 206' including the first switch corresponding to the zero energy level. The circuit 201' would thus recognize a zero energy level (corresponding to the first closed switch) and other energy levels (corresponding to the other closed switches) as proper operating states of the monitored devices, and would continue to send an output signal to the rest of the circuit even if a zero energy level is encountered.

It will be understood that circuit 201 could also be used to monitor different, individual electrical devices, as well as different groups of electrical devices.

Although there have been described what are at present considered to be the preferred embodiments of the present invention, it will be understood that the invention can be embodied in other specific forms without departing from the spirit or essential characteristics thereof. The described embodiments are, therefore, to be considered in all aspects as illustrative, and not restrictive. The scope of the invention is indicated by the appended claims rather than the foregoing description.

TABLE I

| MINIMUM RELAY OUT CURRENT | SW 234 | SW 231 | \multicolumn{10}{c}{Legs of Level Selector Switch} | RESISTOR VALUE |
|---|---|---|---|---|---|---|---|---|---|---|---|---|---|
| | | | 1 | 2 | 3 | 4 | 5 | 6 | 7 | 8 | 9 | 10 | |
| 13 | 1 | 1 | 1 | 0 | 0 | 0 | 0 | 0 | 0 | 0 | 0 | 0 | 2.7K |
| 19 | 1 | 0 | 1 | 0 | 0 | 0 | 0 | 0 | 0 | 0 | 0 | 0 | 4.7K |
| 20 | 0 | 1 | 1 | 0 | 0 | 0 | 0 | 0 | 0 | 0 | 0 | 0 | 4.8K |
| 24 | 1 | 1 | 0 | 1 | 0 | 0 | 0 | 0 | 0 | 0 | 0 | 0 | 2.7K |
| 25 | 0 | 0 | 1 | 0 | 0 | 0 | 0 | 0 | 0 | 0 | 0 | 0 | 6.8K |
| 36 | 1 | 0 | 0 | 1 | 0 | 0 | 0 | 0 | 0 | 0 | 0 | 0 | 4.7K |
| 36 | 1 | 1 | 0 | 0 | 1 | 0 | 0 | 0 | 0 | 0 | 0 | 0 | 2.7K |
| 37 | 0 | 1 | 0 | 1 | 0 | 0 | 0 | 0 | 0 | 0 | 0 | 0 | 4.8K |
| 47 | 1 | 1 | 0 | 0 | 0 | 1 | 0 | 0 | 0 | 0 | 0 | 0 | 2.7K |
| 49 | 0 | 0 | 0 | 1 | 0 | 0 | 0 | 0 | 0 | 0 | 0 | 0 | 6.8K |
| 54 | 1 | 0 | 0 | 0 | 1 | 0 | 0 | 0 | 0 | 0 | 0 | 0 | 4.7K |
| 55 | 0 | 1 | 0 | 0 | 1 | 0 | 0 | 0 | 0 | 0 | 0 | 0 | 4.8K |
| 58 | 1 | 1 | 0 | 0 | 0 | 0 | 1 | 0 | 0 | 0 | 0 | 0 | 2.7K |
| 70 | 1 | 1 | 0 | 0 | 0 | 0 | 0 | 1 | 0 | 0 | 0 | 0 | 2.7K |
| 71 | 1 | 0 | 0 | 0 | 0 | 1 | 0 | 0 | 0 | 0 | 0 | 0 | 4.7K |
| 72 | 0 | 1 | 0 | 0 | 0 | 1 | 0 | 0 | 0 | 0 | 0 | 0 | 4.8K |
| 75 | 0 | 0 | 0 | 0 | 1 | 0 | 0 | 0 | 0 | 0 | 0 | 0 | 6.8K |
| 80 | 1 | 1 | 0 | 0 | 0 | 0 | 0 | 0 | 1 | 0 | 0 | 0 | 2.7K |
| 88 | 1 | 0 | 0 | 0 | 0 | 0 | 1 | 0 | 0 | 0 | 0 | 0 | 4.7K |
| 90 | 0 | 1 | 0 | 0 | 0 | 0 | 1 | 0 | 0 | 0 | 0 | 0 | 4.8K |
| 91 | 1 | 1 | 0 | 0 | 0 | 0 | 0 | 0 | 0 | 1 | 0 | 0 | 2.7K |
| 97 | 0 | 0 | 0 | 0 | 1 | 0 | 0 | 0 | 0 | 0 | 0 | 0 | 6.8K |
| 102 | 1 | 1 | 0 | 0 | 0 | 0 | 0 | 0 | 0 | 0 | 1 | 0 | 2.7K |
| 106 | 1 | 0 | 0 | 0 | 0 | 0 | 0 | 1 | 0 | 0 | 0 | 0 | 4.7K |
| 107 | 0 | 1 | 0 | 0 | 0 | 0 | 0 | 1 | 0 | 0 | 0 | 0 | 4.8K |
| 112 | 1 | 1 | 0 | 0 | 0 | 0 | 0 | 0 | 0 | 0 | 0 | 1 | 2.7K |
| 121 | 0 | 0 | 0 | 0 | 0 | 1 | 0 | 0 | 0 | 0 | 0 | 0 | 6.8K |
| 123 | 1 | 0 | 0 | 0 | 0 | 0 | 0 | 0 | 1 | 0 | 0 | 0 | 4.7K |
| 125 | 0 | 1 | 0 | 0 | 0 | 0 | 0 | 0 | 1 | 0 | 0 | 0 | 4.8K |
| 140 | 1 | 0 | 0 | 0 | 0 | 0 | 0 | 0 | 0 | 1 | 0 | 0 | 4.7K |
| 142 | 0 | 1 | 0 | 0 | 0 | 0 | 0 | 0 | 0 | 1 | 0 | 0 | 4.8K |
| 144 | 0 | 0 | 0 | 0 | 0 | 0 | 1 | 0 | 0 | 0 | 0 | 0 | 6.8K |
| 157 | 1 | 0 | 0 | 0 | 0 | 0 | 0 | 0 | 0 | 0 | 1 | 0 | 4.7K |
| 159 | 0 | 1 | 0 | 0 | 0 | 0 | 0 | 0 | 0 | 0 | 1 | 0 | 4.8K |
| 168 | 0 | 0 | 0 | 0 | 0 | 0 | 0 | 1 | 0 | 0 | 0 | 0 | 6.8K |
| 174 | 1 | 0 | 0 | 0 | 0 | 0 | 0 | 0 | 0 | 0 | 0 | 1 | 4.7K |
| 177 | 0 | 1 | 0 | 0 | 0 | 0 | 0 | 0 | 0 | 0 | 0 | 1 | 4.8K |
| 192 | 0 | 0 | 0 | 0 | 0 | 0 | 0 | 0 | 1 | 0 | 0 | 0 | 6.8K |
| 225 | 0 | 0 | 0 | 0 | 0 | 0 | 0 | 0 | 0 | 0 | 1 | 0 | 6.8K |
| 241 | 0 | 0 | 0 | 0 | 0 | 0 | 0 | 0 | 0 | 0 | 0 | 1 | 6.8K |

We claim:

1. Apparatus for sensing a plurality of energy levels in a conductor, comprising:
   inductive means for sensing an energy level in a conductor and for providing an input signal indicative of the energy level;
   comparator means for receiving the input signal, comparing the input signal to at least one predetermined level range, and providing an output signal to drive logic devices when the input signal falls within the predetermined level range;
   power source means for supplying power to the comparator means;
   said comparator means comprising a multi-level gate and a level selector switch;
   said multi-level gate having a plurality of output terminals and each output terminal having a different, predetermined level range associated therewith;
   said multi-level gate being adapted to compare the input signal to all of the predetermined level ranges associated with the output terminals and to provide an output signal to any of the output terminals when the input signal falls within the predetermined level range associated therewith;
   said level selector switch being adapted to selectively connect at least one of the output terminals of the multi-level gate to an output line so as to pass the output signal therethrough.

2. Energy sensing apparatus according to claim 1, wherein:
   values of the predetermined level ranges associated with the output terminals of the multi-level gate are non-overlapping with each other; and
   said multi-level gate is adapted to automatically compare the input signal to the predetermined level ranges associated with the output terminals in a stepped manner, and to provide an output signal to one of the output terminals when the input signal falls within the predetermined level range associated with that terminal.

3. Energy sensing apparatus according to claim 1, wherein:
   said level selector switch is adapted to selectively connect different combinations of the output terminals of said multi-level gate to the output line so that the level selector switch will pass an output signal to the output line whenever the multi-level gate provides the output signal to one of the connected output terminals.

4. Energy sensing apparatus according to claim 3, wherein:
   the predetermined level range associated with one of the output terminals of the multi-level gate has very low parameters so that the multi-level gate that will provide an output signal to that terminal when the input signal indicates a substantially zero energy level in the conductor.

5. Energy sensing apparatus according to claim 1, wherein:
   said comparator means further comprises an adjustment means which can be selectively set to numerous positions for thereby selectively changing the predetermined level ranges associated with the output terminals of the multi-level gate.

6. Energy sensing apparatus according to claim 1, wherein;
   said apparatus further includes means for modifying the input signal before it is received by said multi-level gate such that the input signal will be modified to indicate at least a minimum energy level in the conductor.

7. Energy sensing apparatus according to claim 6, wherein:
   said modifying means includes means for applying a zero bias signal to the input signal.

8. Energy sensing apparatus according to claim 7, said energy sensing apparatus further comprising:
   detector means connected to said comparator means through said output line for receiving said output signal therefrom; and
   indicator means connected to said detector means for receiving an enable signal therefrom;
   said detector means being adapted to provide said enable signal to said indicator means whenever it does not receive the output signal from the comparator means.

9. Apparatus for sensing a plurality of energy levels in a conductor, comprising:
   inductive means for sensing an energy level in a conductor and for providing an input signal indicative of the energy level;
   comparator means for receiving the input signal, comparing the input signal to at least one predetermined level range, and providing an output signal when the input signal falls within the predetermined level range;
   power source means for supplying power to the comparator means;
   means for modifying the input signal before it is received by the comparator means such that the input signal will be modified to indicate at least a minimum energy level in the conductor;
   said modifying means including means for applying a zero bias signal to the input signal;
   detector means connected to said comparator means through an output line for receiving an output signal therefrom;
   indicator means connected to said detector means for receiving an enable signal therefrom;
   said detector means being adapted to provide said enable signal to said indicator means whenever it does not receive the output signal from the comparator means;
   timer means connected to said comparator means and to said detector means, said timer means being adapted to be actuated whenever it does not receive the output signal from the comparator means and to provide a timer signal to said detector means a predetermined time thereafter; and
   said detector means being adapted to provide said enable signal to said indicator means whenever it receives the timer signal, but does not simultaneously receive the output signal.

10. Energy sensing apparatus
    for sensing a plurality of energy levels in a conductor, comprising:
    inductive means for sensing an energy level in a conductor and for providing an input signal indicative of said energy level;
    comparator means for receiving said input signal, comparing said input signal to a plurality of predetermined level ranges and providing an output signal when said input signal falls within at least one of said predetermined level ranges;
    detector means connected to said comparator means for receiving the output signal therefrom;

indicator means connected to said detector means for receiving an enable signal therefrom;

said detector means being adapted to provide said enable signal to said indicator means whenever it does not receive the output signal from said comparator means;

power supply means for providing power to said comparator means, said detector means and said indicator means:

timer means connected to said comparator means for receiving the output signal therefrom, and also connected to said detector means and said power supply means, said timer means being adapted to be actuated whenever it does not receive the output signal from said comparator means and to provide a timer signal to said detector means a predetermined time thereafter;

said detector means being adapted to provide said enable signal to said indicator means whenever it receives said timer signal, but does not simultaneously receive said output signal.

11. Energy sensing apparatus according to claim 10, wherein:

said comparator means includes a multi-level gate and a level selector switch;

said multi-level gate having a plurality of output terminals and a predetermined level range associated with each output terminal, said multi-level gate being adapted to compare said input signal to the predetermined level ranges and to provide an output signal to any of the output terminals if the input signal falls within the predetermined level range associated therewith; and said level selector switch being adapted to selectively connect various combinations of the output terminals of said multi-level gate to an output line leading from said comparator means.

12. Energy sensing apparatus according to claim 11, wherein:

said comparator means further includes an adjustment means for selectively changing the predetermined level ranges associated with the output terminals of said multi-level gate.

13. Energy sensing apparatus according to claim 11, wherein:

one of the predetermined level ranges has a very low value so that the multi-level gate will provide an output signal to the output terminal associated with that predetermined level range when the input signal indicates a substantial zero energy level in the conductor.

14. Energy sensing apparatus according to claim 13, wherein:

said apparatus further comprises means for modifying the input signal before it is received by the comparator means such that the input signal will indicate at least a minimum energy level in the conductor.

15. Energy sensing apparatus according to claim 14, wherein:

said modifying means includes means for generating a zero bias signal and for applying the zero bias signal to the input signal.

* * * * *

UNITED STATES PATENT AND TRADEMARK OFFICE
CERTIFICATE OF CORRECTION

PATENT NO. : 4,972,153

DATED : November 20, 1990

INVENTOR(S) : Zucker et al.

It is certified that error appears in the above-identified patent and that said Letters Patent is hereby corrected as shown below:

Column 1, line 19, change "of" (first occurence) to --or--.

Signed and Sealed this

Nineteenth Day of May, 1992

Attest:

DOUGLAS B. COMER

*Attesting Officer*   *Acting Commissioner of Patents and Trademarks*